United States Patent [19]

Simon

[11] Patent Number: 5,241,848
[45] Date of Patent: * Sep. 7, 1993

[54] LIGHT WEIGHT DRIVE SHAFT

[76] Inventor: Joseph A. Simon, 237 Lothrup, Grosse Points Farms, Mich. 48236

[*] Notice: The portion of the term of this patent subsequent to Apr. 21, 2009 has been disclaimed.

[21] Appl. No.: 824,049

[22] Filed: Jan. 23, 1992

Related U.S. Application Data

[63] Continuation-in-part of Ser. No. 550,303, Jul. 9, 1990, Pat. No. 5,105,644.

[51] Int. Cl.⁵ .............................................. B21C 23/08
[52] U.S. Cl. .................................................... 72/260
[58] Field of Search ........................... 72/260, 264, 370

[56] References Cited

U.S. PATENT DOCUMENTS

| | | | |
|---|---|---|---|
| 2,363,635 | 11/1944 | Blair | 72/260 |
| 2,452,628 | 11/1948 | Bartlett et al. | 72/370 |
| 5,105,644 | 4/1992 | Simon | 72/260 |

FOREIGN PATENT DOCUMENTS

| | | | |
|---|---|---|---|
| 212808 | 12/1983 | Japan | 72/260 |
| 383300 | 12/1964 | Switzerland | 72/260 |

*Primary Examiner*—Lowell A. Larson
*Attorney, Agent, or Firm*—Harness, Dickey & Pierce

[57] ABSTRACT

An elongated, rod-like rack for use in an automotive-type steering gear assembly and like mechanisms, is formed of an elongated extruded tube divided lengthwise into a substantially solid rack portion and a substantially hollow, link portion. Transversely extending teeth are broached on the rack portion for engagement with a drive pinion means and the like for transmitting power through the rack. The rack is formed by positioning a tubular blank within an open ended extrusion die having an extrusion throat and pushing the tubular blank through the throat for extruding the material longitudinally and collapsing radially inwardly to form a substantially solid, elongated rack portion continuing the pushing the blank with the mandrel within the die throat to extrude a thin wall length, which forms the hollow, integral link part of the rack. The trailing end may be terminated in an inwardly extending, thick wall portion suitable for forming threads thereon.

12 Claims, 3 Drawing Sheets

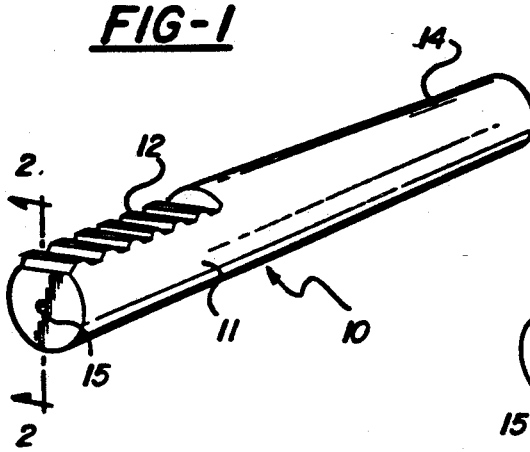
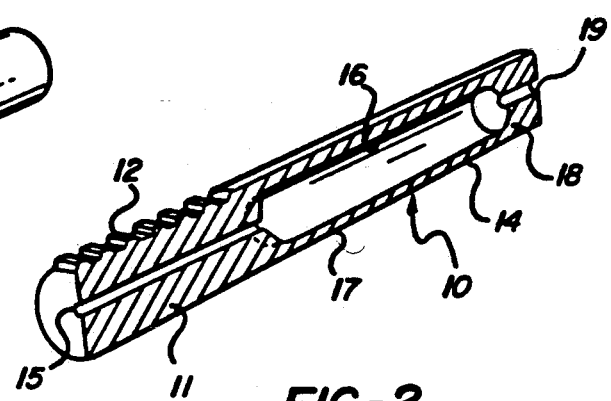
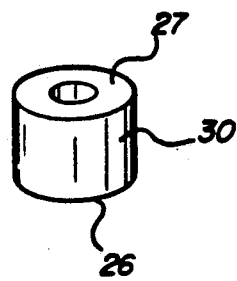
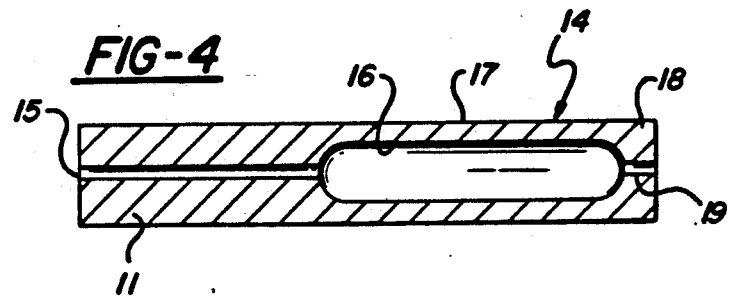
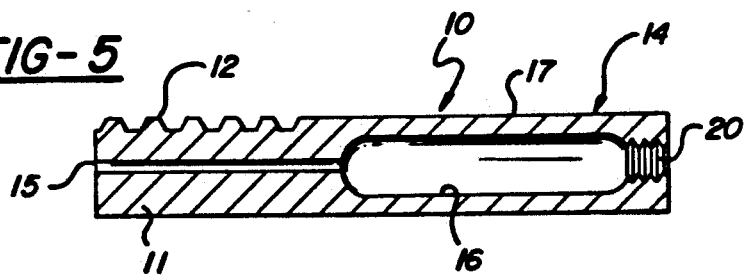
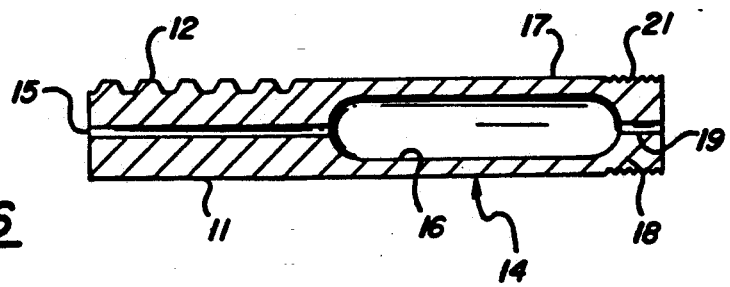

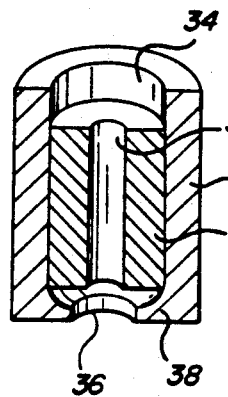
FIG-7
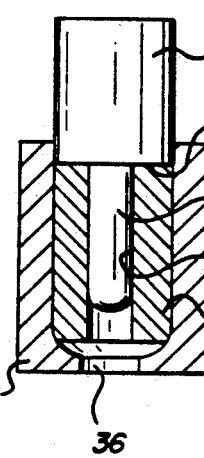
FIG-8
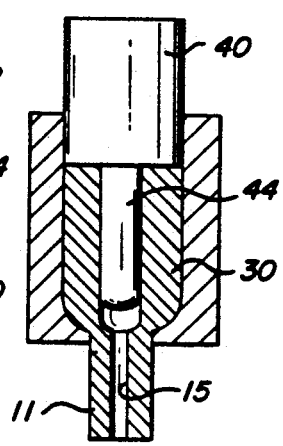
FIG-9
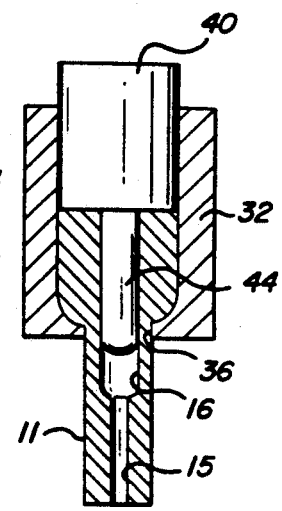
FIG-10
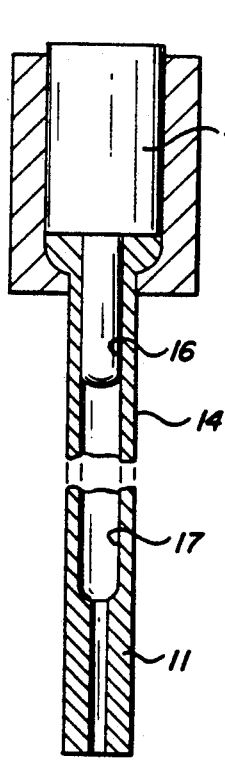
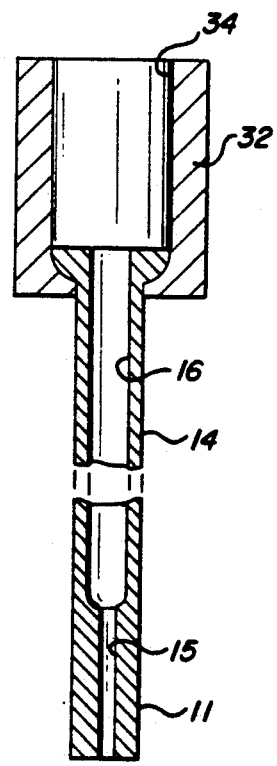
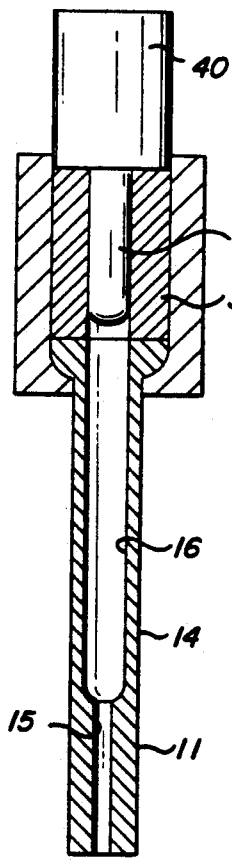
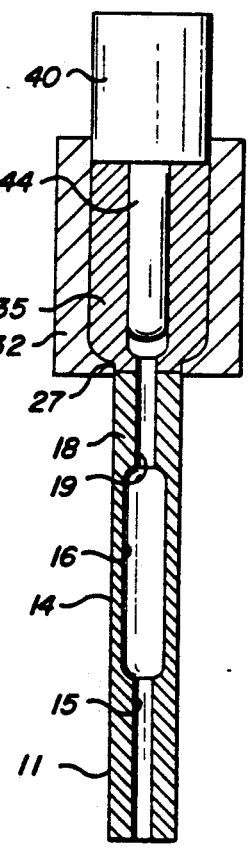
FIG-11   FIG-12   FIG-13   FIG-14

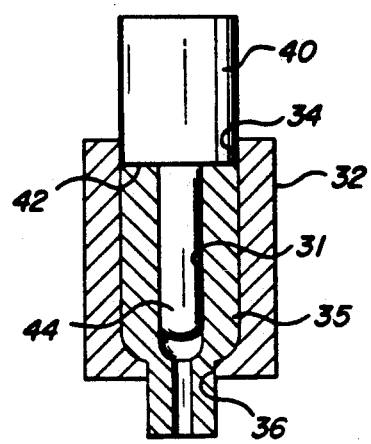
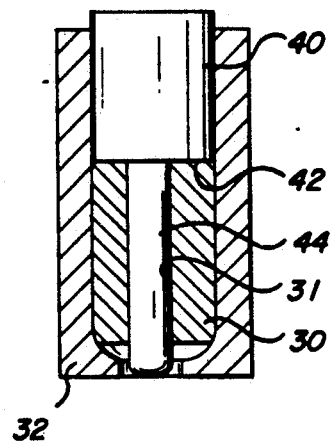
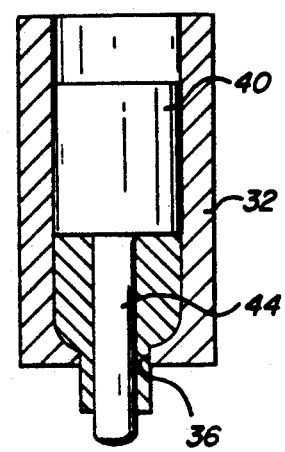
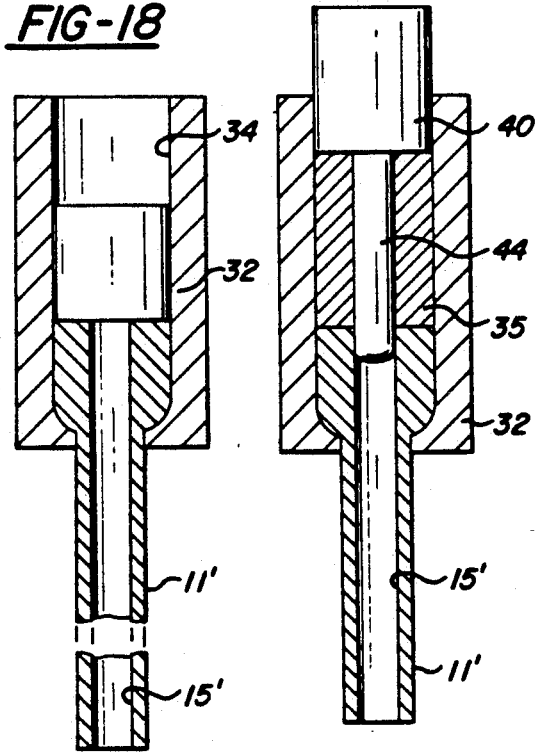
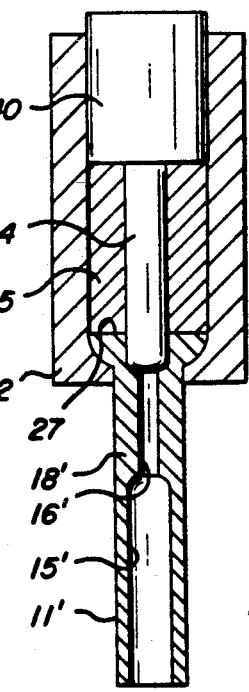
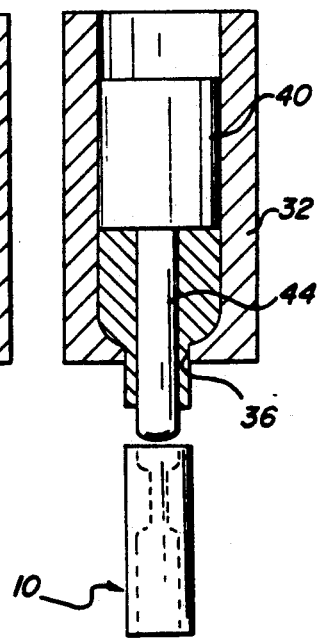

LIGHT WEIGHT DRIVE SHAFT

RELATED APPLICATIONS

This is a continuation in part application of U.S. patent application Ser. No. 07/550,303, filed Jul. 9, 1990, entitled "Lightweight Drive Shaft", now U.S. Pat. No. 5,105,644 granted Apr. 21, 1992, the specification and drawings of which are herein expressly incorporated by reference.

BACKGROUND OF INVENTION

This invention relates to an improved, elongated, rod-like, rack used in automotive-type steering gear assemblies and similar types of mechanisms which utilize a pinion means for transmitting power through a rack and linkage to other elements. The improvement is concerned with lightening the weight of the rack and reducing the expense of its manufacture.

Automotive-type steering gear assemblies include an elongated rod which is engaged at one end by a pinion means for moving the rod, and is connected at its opposite end to elements for causing the wheels of the vehicle to turn. In essence, the rod consists of an elongated, steel bar having gear-like rack teeth machined, such as by broaching or machine tool cutting, transversely along one end portion thereof. The opposite end portion is typically provided with external threading for threadedly engaging with a coupling to another element. It is important that the rod-like rack be strong and rigid and, therefore, it is relatively heavy in weight.

Attempts have been made to reduce the weight of the rod-like rack by cutting away portions of the metal. That is, attempts have been made to reduce weight by drilling away the central portion of the link part of the rod, leaving the rack tooth bearing portion solid for strength purposes. However, in drilling the central portion of the rack part of the link of the rod or bar, the remaining wall must be left relatively thick in order to permit forming threads on its free portion. In addition, it is common to drill small openings through various portions of the rack for the passage of fluids therethrough.

The drilling away of portions of the rod or bar, in the vicinity of the link part of the rod, is relatively expensive and time consuming. Thus, there has been a need for some practical, inexpensive, method for producing rod-like racks with substantial hollow portions for lightening the weight of the part while, at the same time, not reducing the overall strength and rigidity of the part. The rack is made by means of a generally known cold forming extrusion process, but with certain improvements. The underlying prior art process is illustrated, for example, in my prior U.S. Pat. Nos. 3,837,205 issued Sep. 24, 1974 for a "Process for Cold Forming a Metal Tube with Inwardly Thickened End", 3,886,649 issued Jun. 3, 1975 for a "Process for Cold Forming a Metal Tube with an Inwardly Thickened End", 4,277,969 issued Jul. 14, 1981 for a "Method for Cold Forming Tubes Within Interior Thicker Wall Sections" and 4,292,831 issued Oct. 6, 1981 for a "Process for Extruding Metal Tube with Inwardly Thickened End Portions". This invention is concerned with providing an improved rack and method for forming the rack by cold extrusion.

SUMMARY OF INVENTION

This invention contemplates forming an elongated, rod-like rack through an extrusion or cold forming process, by which a short, tubular metal blank is extruded through a die to form a substantially solid, rack portion and a relatively thin wall, hollow link portion having a thickened end section for providing internal or external threads, at the free end of the link portion. The extrusion process, also, produces a central, fine opening through the otherwise solid rack portion which permits the passage of fluid or air, without further drilling, and which also, lightens the rack somewhat. After the extrusion of the rack is completed, it may be suitably machined, such as by broaching, to form the required external, transverse teeth thereon. Also, the free, thickened end section of the link portion may be threaded internally or externally.

The invention contemplates manufacturing the rod-like rack by first, forming a tubular blank having an interior opening which is close to the interior diameter of the thin wall section of the drive tube. The blank is positioned within a tubular die having a constricted extrusion throat through which the blank is extruded.

A power driven punch is inserted within the die. The punch has a longitudinally extending extension which closely fits within the opening in the blank, but does not extend the full length of the blank. That is, it terminates at a predetermined distance from the die throat. The blank moves toward the die throat so that, first, the leading end of the blank is extruded through the die throat to reduce its outer diameter and, simultaneously, to collapse the material inwardly. This forms an inner, tubular opening with a thick wall end section on the tube. By coordinating the length of the extension and the dimensions of the blank, a preselected length of thick wall tubing portion is formed.

Subsequently, as the punch moves towards the die throat, its extension moves into the die throat and remains within the die throat as the punch advances. During that time, further extrusion of the blank results in the blank exterior diameter being extruded to the required exterior diameter of the shaft. But the interior diameter of the tube remains essentially the same as the diameter of the blank and punch extension. This forms the long length, thin wall center section of the drive.

Close to the end of the extrusion of the blank, the punch is stopped and is completely removed. A new blank is placed within the die and then the punch is reinstalled with its extension located within the new blank. Then, movement of the punch towards the throat presses the new blank against the trailing end portion of the first blank. The pressure causes the completion of the extrusion of that trailing end portion, while causing the leading end portion of the second blank to extrude. This forms a thick wall end section on the trailing end of the first blank and on the lead end of the second blank.

When the first blank is completely extruded, it is removed and the process is completed to continuously produce the tubes, blank by blank.

An object of this invention is to rapidly and inexpensively form, through a cold forming extrusion process, an elongated bar-like or rod-like device, one portion of which is substantially solid and the other portion of which is substantially hollow, for forming the solid rack portion upon which teeth may be cut and the hollow, rigid, link portion for transmission of the forces from the teeth to a member coupled to the link.

A further object of this invention is to permit forming a thinner wall link portion on a rod-like rack member while still providing sufficient thickening at the terminal part of the link portion for threading or otherwise applying connector means thereto.

Still a further object of this invention is to provide a rod-like, elongated rack member which is substantially solid to provide sufficient material for cutting threads and, simultaneously, is hollow where possible for reducing weight of the device without reducing its strength.

An additional object is to provide a rack which may be manufactured relatively inexpensively through extrusion procedures rather than through drilling or metal cutting techniques.

These and other objects and advantages of this invention will become apparent upon reading the following description of which the attached drawings form a part.

DESCRIPTION OF DRAWINGS

FIG. 1 is a perspective view of a rod-like, elongated rack member.

FIG. 2 is a cross-sectional, perspective view, taken as if in the direction of arrows 2—2 of FIG. 1.

FIG. 3 is a perspective view of a tubular, metal blank.

FIG. 4 is a cross sectional view, in elevation, of the extruded rack member.

FIG. 5 is a cross sectional view, similar to FIG. 4, but showing the rack teeth and connector threads formed on the rack member.

FIG. 6 is a view similar to FIG. 5, but illustrating a modification where the threads are formed on the exterior of the end of the rack member.

FIG. 7 is a cross sectional, schematic view of the extrusion blank positioned within a die.

FIG. 8 is a cross sectional, schematic view showing the punch located within the die and blank.

FIG. 9 is a schematic, cross sectional view showing the extrusion of the lead portion thick wall section.

FIG. 10 is a schematic, cross sectional view showing the beginning of the extrusion of the thin wall center section.

FIG. 11 is a schematic, cross sectional view showing the completion of the extrusion of the thin wall, center section.

FIG. 12 schematically illustrates the removal of the punch following the extrusion of the center section.

FIG. 13 schematically illustrates the positioning of the second blank within the die and the positioning of the punch within the die and second blank.

FIG. 14 schematically illustrates the completion of the extrusion of the trailing end, thick wall section of the first blank and the extrusion of the leading end portion of the second blank.

FIG. 15 schematically, and partially in cross section, illustrates the removal of the extruded first blank and the continuation of the extrusion of the second blank.

FIG. 16 is a cross sectional, schematic view showing the punch located within the die and blank.

FIG. 17 is a schematic, cross sectional view showing the beginning of the extrusion of the thin wall center section.

FIG. 18 schematically illustrates the removal of the punch following the extrusion of the center section.

FIG. 19 schematically illustrates the positioning of the second blank within the die and the positioning of the punch within the die and second blank.

FIG. 20 schematically illustrates the completion of the extrusion of the trailing end thin wall section of the first blank and the extrusion of the leading end portion of the second blank.

FIG. 21 schematically, and partially in ross section, illustrates the removal of the extruded first blank and the continuation of the extrusion of the second blank.

DETAILED DESCRIPTION

FIG. 1 illustrates, in perspective, a rod-like rack 10. The rack is formed of two parts or sections. One section forms a rack part 11 upon which gear-like teeth are cut, such as by broaching transversely of the axis of the rack. The second section, which is the remainder of the rod-like rack, forms an elongated link part 14. As illustrated in the cross sectional view of FIG. 2, the rack section is substantially solid in cross section. However, it is formed with a fine small diameter, opening 15 extending along its central axis. The link part 14 is formed with a uniform cross section, hollow interior 16. Thus, the link part is provided with a thin wall 17.

The link part is integral, end to end with the tack part. Its free end is preferably formed with a thick wall end section 18 which is provided with a small diameter opening 19 extending along its axis.

As illustrated in FIG. 5, the small diameter opening 19 in the end of the link part may be drilled and tapped to provide an internal thread 20 for connection with a corresponding machine element. Alternatively, the thickened end 18 may have an external thread 21 formed thereon (see FIG. 6) for coupling to another element. Significantly, the thickened end portion provides a wall which is thick enough for threading without adversely affecting the strength of the part. By comparison, the thin wall 17 of the link part may not be thick enough to retain adequate strength if threads or the like are formed either internally or externally of the wall.

In manufacturing the rack, the process begins with a short, tubular blank 30, made of a suitable metal, such as a steel material having the desired characteristics. FIG. 3 illustrates the blank in perspective. The blank opposite ends are designated as a leading end 26 and a trailing end 27. The blank is extruded to form a uniform, exterior diameter bar with uniform diameter hollow interior in the link part, with the fine opening in the rack part, and the opening in the thickened wall part. After the blank is extruded, the rack teeth 12 are cut. In addition, where the part is used in an automotive steering gear, it is necessary to drill transverse holes opening into the hollow interior of the link part and, possibly other locations, to permit fluid flow through the center of the part as may be required. Such holes are omitted, as not forming part of this invention.

The process for manufacturing the drive shaft starts with a tubular blank 30 (see FIG. 3) which has a central opening or hole 31. The diameter of that hole is about equal to the intended diameter of the interior of the thin wall center section 16.

The blank is dropped into a tubular die 32 through an open entry end 34 in the die. The opposite end of the die is provided with a constricted extrusion throat 36 provided by an annular, inwardly extending shoulder 38.

After the blank is dropped into the die, a punch 40 is positioned in the die. The punch has a lead end which is formed as an annular, blunt surface 42 which overlaps and abuts the trailing end 27 of the blank. In addition, the punch has a punch extension 44 which is of a diameter that approximates the diameter of the hole 31 in the blank. Thus, the extension closely fits within the blank hole.

The punch extension is of a length that is slightly less than the height of the blank, as illustrated in FIG. 8. Thus, its free end is spaced longitudinally away from the die throat a short distance.

FIG. 8 illustrates the blank positioned within the die and the punch, with its punch extension 32, positioned relative to the blank 30. Then, the punch is moved towards the die throat, as illustrated in FIG. 9. This causes the leading end of the blank to extrude through the die throat. As the end portion extrudes, it collapses radially inwardly, leaving the central, smaller diameter opening 15. During this time, the punch extension is located above, that is, spaced from, the die throat.

As the punch continues movement towards the die throat, its extension 44 enters the die throat. There, the punch extension acts like a mandrel and the continued extrusion forms the thin wall, center section of the shaft. As the die continues its movement, the punch moves through the die throat, remaining within the die throat as a mandrel, as shown in FIG. 11. At that point, the extrusion of the thin wall, center section is complete.

Next, the punch is removed from the die, as shown in FIG. 12, leaving the trailing end portion of the blank unextruded. Next, a second blank 35, identical to the first blank, is dropped into the die through its entry end. The same punch is replaced in position within the die. Now, the punch abuts the second blank and its extension extends into the opening in the second blank. Again, the punch is moved toward the die throat so that the second blank acts as the punch did in pushing the first blank through the die throat for extruding it.

As shown in FIG. 14, the continued movement of the punch, with the punch extension spaced longitudinally away from the die throat, causes the trailing end portion of the first blank to extrude and, simultaneously, collapse inwardly to form the thick wall end section 18. Meanwhile, the lead end portion of the second blank is extruded through the die throat and, likewise, collapses inwardly to form the thick wall end extension 11.

Next, as illustrated in FIG. 15, the lead end of the second blank continues extruding through the die throat, pushing the first blank out of the die throat so that the extruded first blank may be removed for forming the connection configurations on its ends.

Turning to FIGS. 16 through 21, another embodiment of the invention is shown. Here, the rack is manufactured with thin wall ends and a thick wall connecting portion. The gear teeth 12 would be cut into the thick wall portion of the rod.

The process for manufacturing the drive shaft starts with a tubular blank 30 (see FIG. 3) which has a central opening or hole 31. The diameter of that hole is about equal to the intended diameter of the interior of the thin wall center section 16.

The blank is dropped into a tubular die 32 through an open entry end 34 in the die. The opposite end of the die is provide with a constricted extrusion throat 36 provided by an annular, inwardly extending shoulder 38.

After the blank is dropped into the die, a punch 40 is positioned in the die. The punch has a lead end which is formed as an annular, blunt surface 42 which overlaps and abuts the trailing end 27 of the blank. In addition, the punch has a punch extension 44 which is of a diameter that approximates the diameter of the hole 31 in the blank. Thus, the extension closely fits within the blank hole.

The punch extension is of a length that is greater than the height of the blank, as illustrated in FIG. 16. Thus, its free end extends longitudinally into the die throat a short distance.

FIG. 16 illustrates the blank positioned within the die and the punch, with its punch extension 44 positioned relative to the blank 30. Then, the punch is moved through the die throat, as illustrated in FIG. 17. This cause the leading end of the blank to extrude through the die throat.

The punch extension acts like a mandrel and the continued extrusion forms the thin wall, end section of the shaft. As the die continues its movement, the punch moves through the die throat, remaining within the die throat as a mandrel, as shown in FIG. 17. At that point, the extrusion of the thin wall end section is complete.

Next, the punch is removed from the die, as shown in FIG. 18, leaving the trailing end portion of the blank unextruded. Next, a second blank 35, identical to the first blank, is dropped into the die through its entry end. The same punch is replaced in position within the die. Now, the punch abuts the second blank and its extension extends into the opening in the second blank and into a portion of the first blank as seen in FIG. 19. Again, the punch is moved toward the die throat so that the second blank acts as the punch did in pushing the first blank through the die throat for extruding it.

As shown in FIG. 20, the continued movement of the punch, with the punch extension spaced longitudinally away from the die throat, causes the connecting portion of the first blank to extrude and, simultaneously, collapse inwardly to form the thick wall connecting of center section 18'. Meanwhile, the trailing end portion of the first blank is extruded through the die throat on the mandrel to form the thin wall end extension 11'.

Next, as illustrated in FIG. 21, the lead end of the second blank continues extruding through the die throat, pushing the first blank out of the die throat s that the extruded first blank may be removed for forming the teeth, threads or the like.

Also, it should be noted that while the invention illustrates a punch moving through the die, the method could be equally performed by moving the die along the punch and mandrel.

The sizes of the shafts typically may range from 12 inch length to 36 inch lengths, with the diameter ranging between roughly 1 to 3 inches. Similarly, the wall thicknesses may vary from $\frac{1}{8}$ inch to $\frac{1}{4}$ inch for the thin wall section with the thick wall being roughly twice that thickness.

The foregoing description discloses an operative embodiment of this invention. Accordingly, it is desired that the description be read as being merely illustrative of an operative embodiment and not in strictly limited sense.

Having fully described such an operative embodiment, I now claim:

1. A method for forming a light weight, elongated shaft which may be used in an automotive vehicle and the like, comprising:

placing a tubular, metal blank having a lead end and a trailing end within an open ended tubular die having an entry end through which the blank is inserted for positioning within the die, and having an outlet in the form of an annular, radially inwardly extending, die throat of a smaller diameter than the blank outer diameter, with the blank leading edge arranged adjacent the throat for extrusion therethrough;

inserting a punch, having an annular, relatively blunt surface leading end, into the die entry end, with the punch closely fitted within the die, and with the punch leading end overlapping and engaging the trailing end of the blank, and with the punch having a longitudinally aligned punch extension which extends from said punch end, inserted into the blank tubular inner opening for closely fitting within the opening, and arranging the punch extension so that it extends from the blank trailing end towards, but a predetermined distance inwardly of the blank, from the leading end of the blank;

moving the blank towards the die throat, a predetermined distance wherein the punch extension remains spaced longitudinally inwardly from the die throat, to extrude the leading end portion of the blank through the die throat and, thereby, simultaneously collapse the leading end portion of the blank radially inwardly so as to form said portion into a thick wall tubular extruded section of a predetermined length which corresponds to the punch extension remaining outwardly of the die throat;

continuing moving the blank with the punch extension positioned within and longitudinally moving within the die until the punch enters the die throat and, thereafter, continuing such longitudinal movement to extrude the corresponding blank portion into an elongated, thin wall, predetermined length section;

stopping the punch movement upon completion of the extrusion of the thin wall section, and retracting the punch and its extension from the portion of the blank remaining within the die and outwardly of the die, and inserting a second blank, similar to the first blank, into the die;

reinserting the punch into the die with its extension closely fitted within the tubular inner opening of the second blank, and with the punch blunt end engaging the trailing end of the second blank, so that the punch extension is arranged to extend from the trailing end to substantially the same predetermined distance longitudinally inwardly from the leading end of the second blank as was used with the first blank;

longitudinally moving the leading end of the second blank against the trailing end of the first blank to extrude the trailing end portion of the first blank, followed by the leading end portion of the second blank, through the die throat, while the punch extension is spaced longitudinally inwardly from the die throat to cause such first and second blank trailing end and leading end portions respectively, to collapse radially inwardly as they extrude through the die throat for forming thick wall sections corresponding to the thick wall section formed on the leading end portion of the first blank;

continuing movement until the first blank is completely extruded through the die throat by the moving second blank, and then repeating the foregoing steps for continuously producing extruded shafts.

2. A method as defined in claim 1, and including forming teeth on the exterior of at least one of the thick wall sections following the extrusion thereof.

3. A method as defined in claim 1, and including forming threads on the exterior of at least one of the thick wall sections of the extruded shaft.

4. A method as defined in claim 1, and including forming threads on the interior of at least on of the thick wall sections of the extruded shaft.

5. A method as defined in claim 1, and including moving the punch with respect to the die.

6. A method as defined in claim 1, and including moving the die with respect to the punch.

7. A method for forming an elongated rack for use in transmitting forces from a pinion means in an automotive type steering gear assembly and formed of a elongated rack part integral end to end with an elongated link part, comprising:

placing a tubular, metal blank having a lead end and a trailing end within an open ended tubular die having an entry end through which the blank is inserted for positioning within the die, and having an outlet in the form of an annular, radially inwardly extending, die throat of a smaller diameter than the blank outer diameter, with the blank leading edge arranged adjacent the throat for extrusion therethrough;

inserting a punch, having an annular, relatively blunt surface leading end, into the die entry end, with the punch closely fitted within the die, and with the punch leading end overlapping and engaging the trailing end of the blank, and with the punch having a longitudinally aligned punch extension which extends from said punch end inserted into the blank tubular inner opening for closely fitting within the opening, and arranging the punch extension so that it extends from the blank trailing end towards, but a predetermined distance inwardly of the blank, from the leading end of the blank;

moving the blank towards the die throat, a predetermined distance wherein the punch extension remains spaced longitudinally inwardly from the die throat, to extrude the leading end portion of the blank through the die throat and, thereby, simultaneously collapse the leading end portion of the blank radially inwardly so as to form said portion into a thick wall tubular extruded section of a predetermined length which corresponds to the punch extension remaining outwardly of the die throat;

continuing moving the blank with the punch extension positioned within and longitudinally moving within the die until the punch enters the die throat and, thereafter, continuing such longitudinal movement to extrude the corresponding blank portion into an elongated, thin wall, predetermined length section;

stopping the punch movement upon completion of the extrusion of the thin wall section, and retracting the punch and its extension from the portion of the blank remaining within the die and outwardly of the die, and inserting a second blank, similar to the first blank, into the die;

reinserting the punch into the die with its extension closely fitted within the tubular inner opening of the second blank, and with the punch blunt end engaging the trailing end of the second blank, so that the punch extension is arranged to extend from the trailing end to substantially the same predetermined distance longitudinally inwardly from the leading end of the second blank as was used with the first blank;

longitudinally moving the leading end of the second blank against the trailing end of the first blank to extrude the trailing end portion of the first blank, followed by the leading end portion of the second blank, through the die throat, while the punch extension is spaced longitudinally inwardly from the die throat to cause such first and second blank trailing end and leading end portions respectively, to collapse radially inwardly as they extrude through the die throat for forming thick wall sections corresponding to the thick wall section formed on the leading end portion of the first blank;

continuing movement until the first blank is completely extruded through the die throat by the moving second blank, and then repeating the foregoing steps for continuously producing extruded shafts.

8. A method as defined in claim 7, and including forming teeth on the exterior of at least one of the thick wall sections following the extrusion thereof 9. A method as defined in claim 7, and including forming threads on the exterior of at least one of the thick wall sections of the extruded shaft.

10. A method as defined in claim 7, and including forming threads on the interior of at least one of the thick wall sections of the extruded shaft.

11. A method for forming an elongated rack for use in transmitting forces from a pinion means in an automotive type steering gear assembly and formed of an elongated rack part integral end to end with an elongated link part, comprising:

placing a tubular, metal blank having a lead end and a trailing end within an open ended tubular die having an entry end through which the blank is inserted for positioning within the die, and having an outlet in the form of an annular, radially inwardly extending, die throat of a smaller diameter than the blank outer diameter, with the blank leading edge arranged adjacent the throat for extrusion therethrough;

inserting a punch, having an annular, relatively blunt surface leading end, into the die entry end, with the punch closely fitted within the die, and with the punch leading end overlapping and engaging the trailing end of the blank, and with the punch having a longitudinally aligned punch extension which extends from said punch end, inserted into the blank tubular inner opening for closely fitting within the opening, and arranging the punch extension so that it extends from the blank trailing end through the blank toward the die throat;

moving the blank to extrude the leading end portion of the blank through the die throat with the punch extensions positioned within and longitudinally moving within the die throat to extrude the leading end portion into an elongated, thin wall, predetermined length section;

stopping the punch movement upon completion of the extrusion of the thin wall section, and retracting the punch and its extension from the portion of the blank remaining within the die and outwardly of the die, and inserting a second blank, similar to the first blank, into the die;

reinserting the punch into the die with its extension closely fitted within the tubular inner opening of the second blank, and with the punch blunt end engaging the trailing end of the second blank, so that the punch extension is arranged to extend from the trailing end into the trailing end of the first blank at a predetermined distance;

longitudinally moving the leading end of the second blank against the trailing end of the first blank to extrude the connecting portion and the trailing end portion of the first blank, followed by the leading end portion of the second blank, through the die throat, the punch extension is spaced longitudinally inwardly from the die throat to cause the connection portion of the first blank to collapse radially inwardly as it extrudes through the die throat for forming a thick wall section continuing movement of the first and second blank through the die throat with the extension in the die throat to extrude the trailing end portion into an elongated, thin wall, predetermined length section and form the leading end of the second blank corresponding to the thin wall section formed on the leading end portion of the first blank;

continuing movement until the first blank is completely extruded through the die throat by the moving second blank, and then repeating the foregoing steps for continuously producing extruded shafts.

12. A method as defined in claim 11, and including forming teeth on the exterior of the thick wall section following the extrusion thereof.

* * * * *